Figure 3:
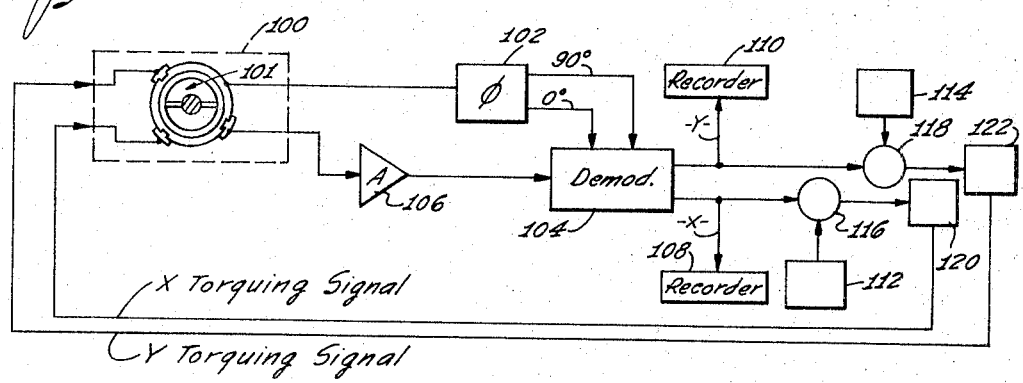

May 9, 1967 H. F. ERDLEY ETAL 3,318,160
VIBRA-ROTOR GYROSCOPE
Filed July 31, 1964 3 Sheets-Sheet 1
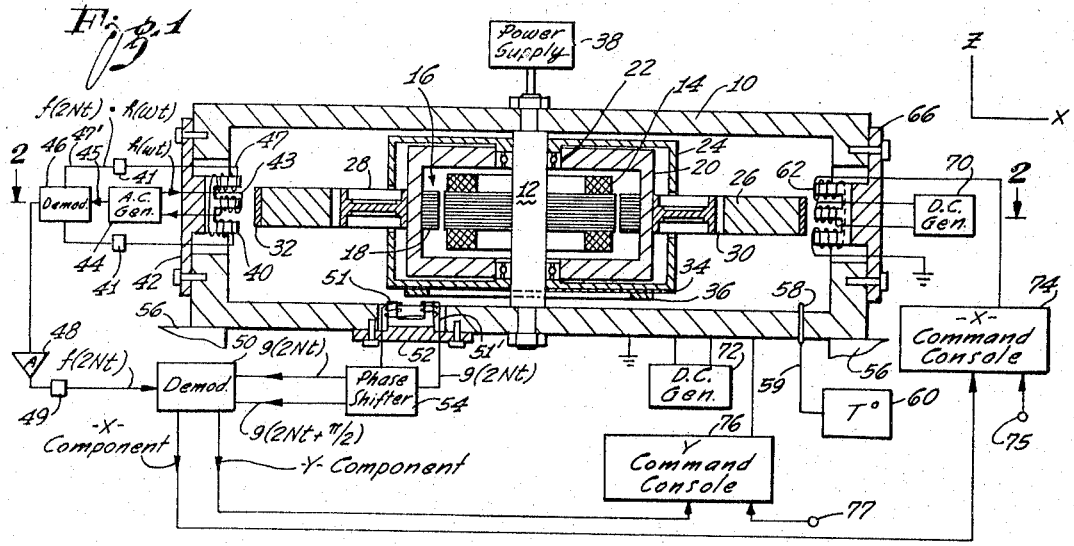
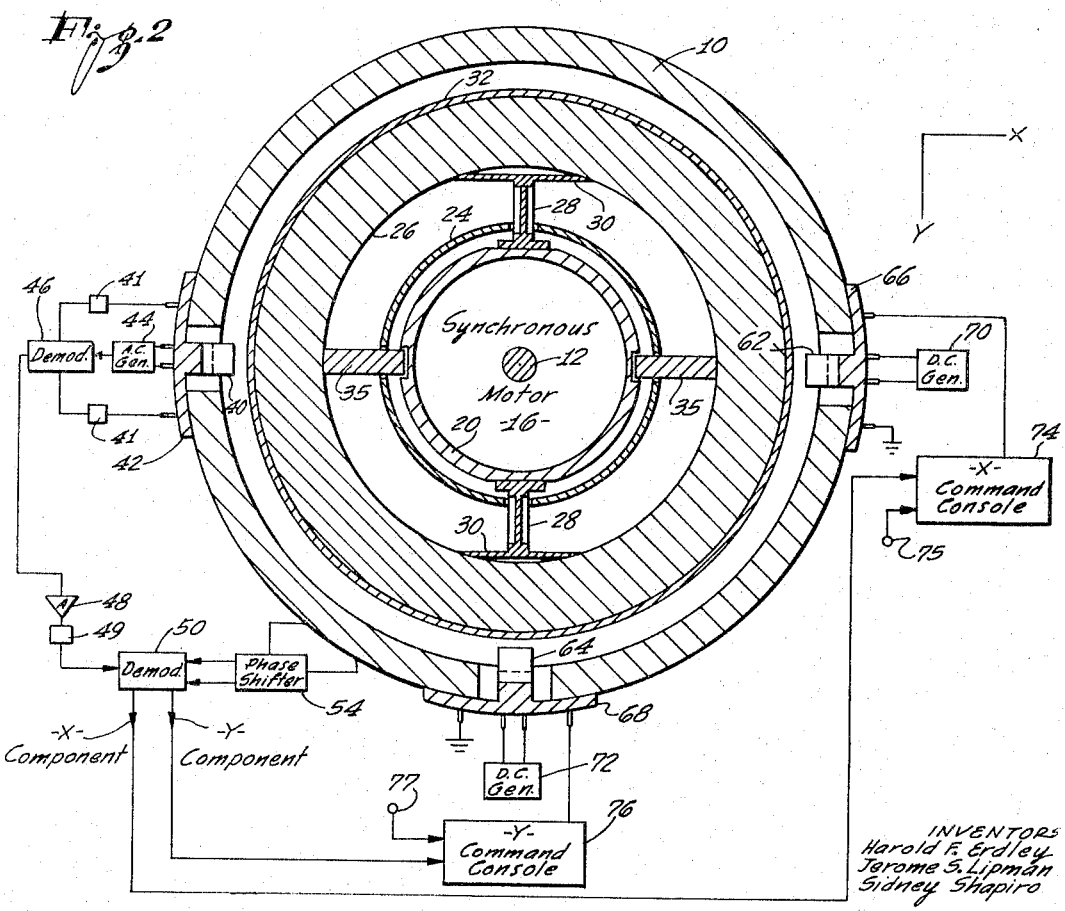
INVENTORS
Harold F. Erdley
Jerome S. Lipman
Sidney Shapiro
By Frederic P. Smith
Attorney INVENTORS:
Harold F. Erdley
Jerome S. Lipman
Sidney Shapiro By Frederic P. Smith
Attorney May 9, 1967  H. F. ERDLEY ETAL  3,318,160
VIBRA-ROTOR GYROSCOPE
Filed July 31, 1964  3 Sheets-Sheet 3
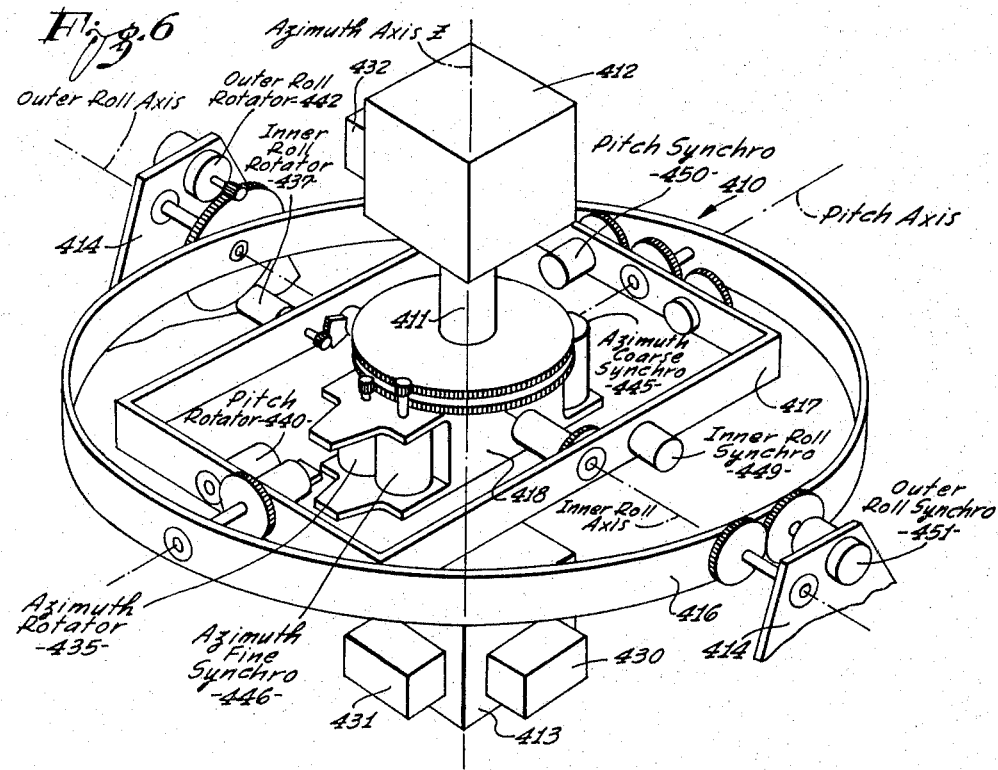
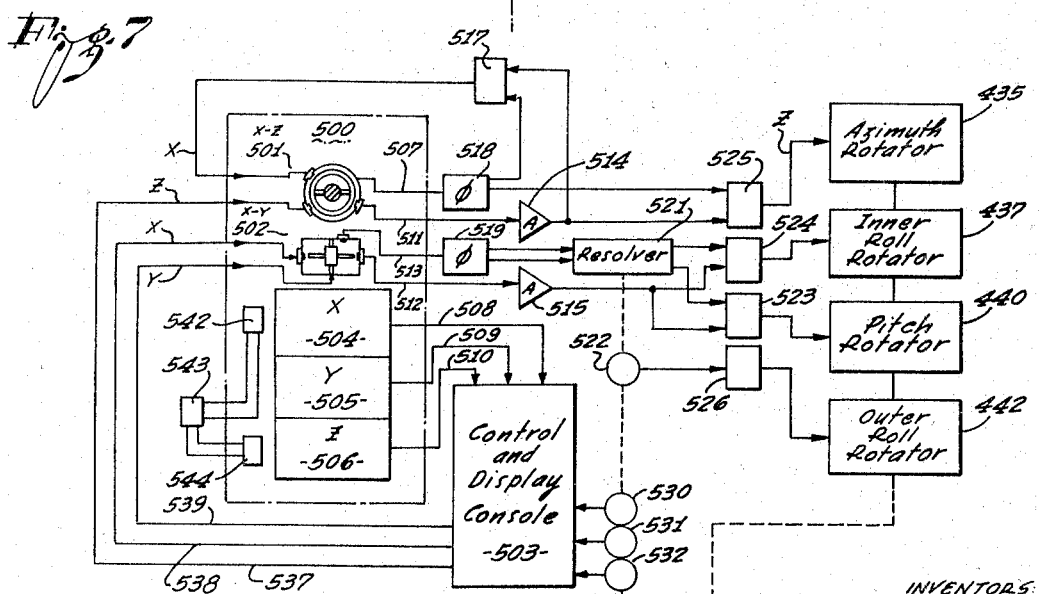
INVENTORS:
Harold F. Erdley
Jerome S. Lipman
Sidney Shapiro
Attorney ary <br>
United States Patent Office 3,318,160
Patented May 9, 1967

3,318,160
VIBRA-ROTOR GYROSCOPE
Harold F. Erdley, Jerome S. Lipman, and Sidney Shapiro, Los Angeles, Calif., assignors to Litton Systems, Inc., Beverly Hills, Calif.
Filed July 31, 1964, Ser. No. 386,596
34 Claims. (Cl. 74—5.4)

The present invention relates in general to navigational and positional systems and, in particular, to navigational and positional systems utilizing a new and improved vibra-rotor gyroscope.

The use in navigational systems of a vibra-rotor gyroscope, a unique inertial instrument possessing many advantages over conventional gyroscopes, is disclosed in a patent application entitled, "Vibra-Rotor Gyroscope," by H. F. Erdley et al., Ser. No. 323,985, filed Nov. 14, 1963, assigned to the assignee of the present application; reference may be made to such application for a more complete analysis of its operation. The vibra-rotor gyroscope comprises an inertial ring which is coaxially mounted upon a rotating shaft. The inertial ring rotates with the shaft and has torsionally restrained vibrational freedom about its mounting axis which is perpendicular to the shaft. In general, the vibrator-rotor gyroscope is designed so that the natural frequency of vibration of the inertial ring about the perpendicular axis is equal to the frequency of shaft rotation. An external angular displacement of the vibra-rotor gyroscope around any axis, except the spin axis, causes the inertial ring to vibrate at its natural frequency, the maximum amplitude of such vibration being proportional to the angular displacement. In addition, the phase of the vibration relative to a timing signal is a direct measure of the direction of the angular displacement. Hence, the vibra-rotor gyroscope may be used in place of a direct reading, two-degree-of-freedom gyroscope.

Since the vibra-rotor gyroscope requires no complicated gimbal suspension system or flotation fluid and is insensitive to stray bearing torques on the shaft bearings, the vibra-rotor gyroscope has an extremely low drift rate and is far superior to conventional gyroscopes. The vibra-rotor gyroscope described in the abovementioned application utilizes, in particular, a sensor and torquer arrangement which is either attached to or rotated synchronously with the inertial ring. This type of sensor and torquer arrangement is designated in the art as rotor-referenced. While the vibra-rotor gyroscope utilizing such a rotor-referenced configuration has been found to perform satisfactorily, nonetheless there is a constant emphasis in the gyroscope art to develop devices which are lighter and more compact and which require less components and drive power. In addition, increased stress is being placed on their accuracy, their stability and dependability, and their easy maintenance. It has been discovered that significant progress can be made toward these goals by incorporating in the vibra-rotor gyroscope an improved sensor-torquer configuration which can best be described as case-referenced along with various other refinements and modifications. In improving the gyroscope, it has been possible to eliminate several of the structural components of the rotor-referenced configuration, such as the rotating housing, the rotary transformers, and the torque resolver, and thus provide a less complex and more accurate vibra-rotor gyroscope.

It is therefore a primary object of this invention to provide a new and improved vibra-rotor gyroscope for use in navigational and positional systems.

Another object of the present invention is to reduce the complexity of the vibra-rotor gyroscope sensor and torquer assembly while increasing the accuracy, stability, and balance of the gyroscope and reducing the weight and the motor drive requirements.

A further object of the invention is to provide a unique sensor and torquer arrangement which does not require a rotary transformer and a torquer resolver.

An additional object of the invention is to provide extremely stable and accurate navigational and positional systems utilizing one or more vibra-rotor gyroscopes.

Generally speaking, in the present invention the sensor and torquer arrangements are mounted on the outer case of the vibra-rotor gyroscope and are stationary with respect to the rotating inertial ring. In a particular embodiment, the torquer arrangement comprises two torquers positioned 90° apart for defining an orthogonal set of case-referenced axes, while the sensor arrangement comprises a single inductive pick-off. As the sensor arrangement and the torquer arrangement are positioned on the outer case of the vibra-rotor gyroscope, it is evident that the above-mentioned structural components utilized in the rotor-referenced configuration can now be omitted.

The novel features which are believed to be characteristic of the invention, both as to its organization and method of operation, together with further objects and advantages thereof, will be better understood from the following description considered in connection with the accompanying drawings. It is to be expressly understood, however, that the drawings are for purposes of illustration and description only and are not intended as a definition of the limits of the invention.

Figure 4:
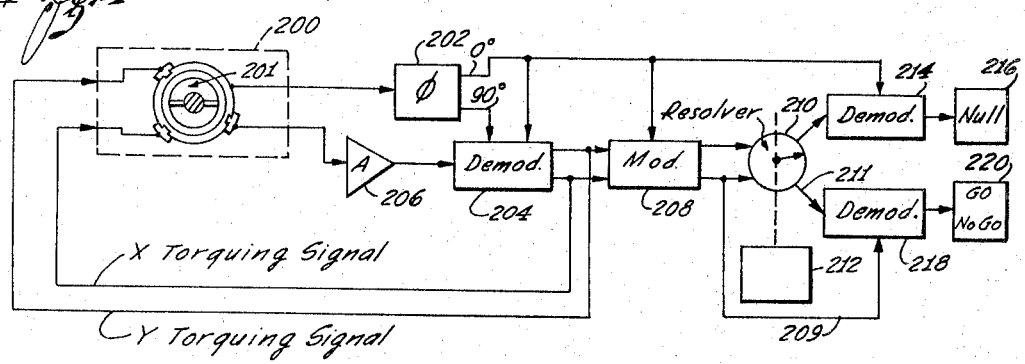
Figure 5:
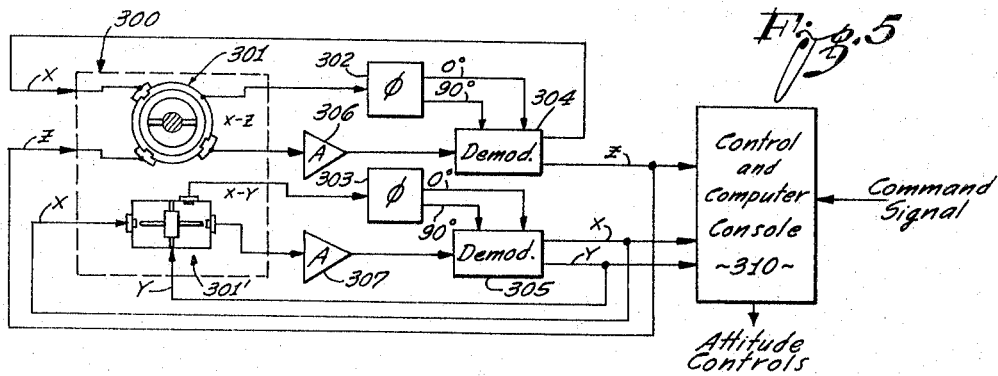

FIGURES 1 and 2 are partial side and plan cross-sectional views of a preferred embodiment of the case-referenced vibra-rotor gyroscope along with block schematic circuitry for the implementation thereof;

FIGURES 3, 4, and 5 are block schematic diagrams of strap-down systems employing one or more case-referenced vibra-rotor gyroscopes in their operation;

FIGURE 6 is a perspective view of an inertial guidance platform in accordance with the invention; and, FIGURE 7 is a block schematic diagram of the circuitry and mechanics of a platform system in accordance with the invention.

In FIGURES 1 and 2, a case-referenced vibra-rotor gyroscope is illustrated comprising a cylindrical outer casing 10 and a spin shaft 12 centrally located therethrough upon which is positioned the stator 14 of a constant speed synchronous hysteresis motor 16. The rotor element 18 of the synchronous motor 16 is affixed to a motor casing 20 which is driven to rotate on ball bearings 22 about the stator 14. The outer case 10 is preferably pressure tight so that it can be completely evacuated or will permit the use of a controlled atmosphere and is generally constructed of a light, but rigid, material such as aluminum. The spin shaft 12 is constructed of a rigid material such as stainless steel. The motor casing 20 is constructed of a high nickel-content iron alloy in order to provide magnetic shielding; if additional shielding is desired, a magnetic shield 24, affixed to the casing of the ball bearings 22, may be provided (as shown) in order to establish a further low reluctance path.

The inertial ring 26 of the vibra-rotor gyroscope is attached to the motor casing 20 by means of a pair of cruciform-shaped torsion bars 28 and a pair of mounting diaphragms 30. As explained in the afore-mentioned application, these elements provide proper flexure characteristics and a substantially symmetrical suspension to eliminate isoelastic drift. Although the inertial ring 26 may be constructed completely of a rigid low reluctance material such as iron or steel, in the embodiment shown an iron or steel ring 32 surrounds a central rigid material, such as titanium, to reduce the weight of the inertial ring 26. A pair of limit-stop bars 35 is also shown in FIGURE 2; these prevent the vibrating inertial ring 26 from exceeding a predetermined maximum excursion. The limit-stop bars 35 pass through holes in the magnetic shield 24 (as do the cruciform-shaped torsion bars 28) and into limiting slots formed in the motor casing 20. Affixed to the lower surface of the magnetic shield 24 is a disc 34 (composed of a high reluctance material such as aluminum) which serves to conductively shield an annular ring 36 (composed of a low reluctance material) from the magnetic field in the magnetic shield 24. Although the annular ring 36 is circularly symmetrical, it is mounted so that its center of symmetry does not coincide with the spin axis 12. As explained further hereafter, the annular ring 36 forms part of the timing generator mechanism of the device. It should be noted that the particular mechanical connection between the inertial ring 26 and the motor 16 is for purpose of illustration only. Thus, for example, the motor 16 may be placed to one side of the inertial ring 26 as illustrated in the aforementioned application.

In operation, the synchronous motor 16 (driven by power source 38) causes the inertial ring 26 to rotate at a predetermined frequency N. If the spring constant of the cruciform-shaped torsion bars 28 and the moments of inertia of the inertial ring 26 (including the iron ring 32) are selected so that the natural frequency of vibration of the inertial ring 26 about the torsion bars 28 is equal to the spin frequency N, the inertial ring 26 will vibrate at such frequency N in response to any angular displacement of the spin axis 12 from its initial attitude. If the damping of the vibrations of the inertial ring 26 is minimized, the maximum excursion of the inertial ring 26 will increase linearly with the continued angular displacement of the spin axis 12 and will thus be representative, for some period, of the angular displacement of the spin axis 12. Furthermore, the point of maximum excursion of the vibrating inertial ring 26 will occur at an angle related to the direction of the change of attitude of the spin axis 12. As described in the afore-mentioned patent application, the angular excursion of the inertial ring 26 can be approximated by the following equation:

$$\theta(t) = \frac{\dot{\phi}C}{D} \frac{t}{T} \cos Nt$$

where:

$\theta$ is the angular excursion of the inertial ring 26 from an initial position and is limited to small angles;

$\dot{\phi}$ is the rate of angular displacement of the spin axis 12 about an axis orthogonal to the spin axis 12;

C is the polar moment of inertia of the inertial ring 26 about the spin axis 12;

D is the angular damping constant of the cruciform-shaped torsion bars 28; and

T is the time constant of the system. T is very much greater than $t$ and is defined by $$T = \frac{2A}{D}$$

where A is the transverse moment of inertia of the inertial ring 26 about an axis orthogonal to the spin axis 12.

This equation demonstrates that for small angles the angular excursion of the inertial ring 26 is directly proportional to the angular displacement of the spin axis 12, multiplied by a cosine term representing the vibrations. Although it is not expressly stated in the above equation, the cosine term contains phase information which can be extracted to yield the angle between the direction of the angular displacement of the spin axis 12 and a coordinate system fixed in the outer case 10 of the vibra-rotor gyroscope.

Since the sensor arrangement in a rotor-referenced configuration is attached to the rotating inertial ring, the electromotive force generated by the vibrational excursion can be approximated by the angular displacement $\phi t$ of the spin axis multiplied by a sinusoidal term having a frequency N. Such an approximation is not valid, however, for applicant's case-referenced system in which the sensor arrangement is stationary. The reason why such as approximation is not valid can be better understood by reference to the sensor structure in applicant's invention.

In FIGURES 1 and 2, an E-shaped sensor arrangement 40, composed of a standard ferrite material, is positioned adjacent to the inertial ring 26 and the iron ring 32 and is attached to the outer case 10 of the vibra-rotor gyroscope by a supporting member 42. The central leg of the E-shaped sensor arrangement 40 is excited by an A.C. generator 44 which generates a signal having a frequency much greater than N. This signal (carried by winding 43) in turn causes an A.C. magnetic field to exist in the closed flux paths defined by the central and outer legs of the sensor arrangement 40 and the iron ring 32. Any vibratory motion of the iron ring 32 will cause a change in the reluctance of the portions of the paths between the central and outer legs of the sensor arrangement 40. Consequently, any signal generated in winding 47 by the A.C. magnetic field will be amplitude modulated by the reluctance changes caused by the vibratory motion of the iron ring 32. The output of sensor arrangement 40 thus comprises an amplitude modulated sensing signal consisting of a carrier signal modulated by the vibratory motion of the iron ring 32.

The output of the sensor arrangement 40 and the signal generated by the A.C. generator 44 are both coupled to a standard demodulator 46 (via leads 47' and 45) which removes the carrier signal and transfers a signal representative of the vibratory motion of the iron ring 32 to an amplifier 48 and then to a second demodulator 50. If undesirable signals are present, an amplifier and filter 41 can be used to allow only the upper or lower sidebands of the modulated sensing signal to be applied to the demodulator 46. Similarly, a filter 49 tuned to the sensing signal frequency can be used after demodulator 46 and amplifier 48 to prevent any undesirable signals from reaching the demodulator 50. While the sensing signal (on lead 47') has been obtained by using an A.C. generator coupled to the central leg of the sensor arrangement 40, many other techniques are possible. For example, a D.C. magnetic field can be generated (in the closed flux paths) by coupling a D.C. generator to, or by using a permanent magnet for, the central leg of the sensor arrangement 40. The sensing signal generated in the winding 47 will thus be directly representative of the vibratory motion of the iron ring 32 and can be coupled directly to demodulator 50 (via amplifier 48 if necessary).

Since the edge of the iron ring 32 nearest the sensor arrangement 40 is not only vibrating but also rotating, the frequency of the electromotive force generated by the positional or velocity changes of the iron ring 32 is a function of both such motions and is primarily equal to the sum of the frequency of rotation and the frequency of vibration (a small difference frequency term also being present). Thus, in the case-referenced arrangement, the sensing signal transferred to the demodulator 50 has, in the ideal case, a frequency of 2N in contrast to the rotor-referenced arrangement where the sensing signal has a frequency of N. As this double frequency sensing signal can be distinguished more easily from spurious noise (by, for example, tuning filter 49 to (2N) the accuracy of the vibra-rotor gyroscope is greatly improved in applicant's invention.

In order to resolve the sensing signal from the sensor arrangement 40 into its components along the set of orthogonal axes fixed in the outer case 10 (to determine the direction of the angular displacement of the spin axis 12 relative to such axes), a timing signal having a frequency 2N is generated. A "C-shaped" timing generator 51 is shown affixed to the outer case 10 by a supporting bracket 52 and comprises two ferrite legs connected by a permanent bar magnet. The rotating annular ring 36 (which forms part of the closed flux path) is positioned off-center so as to vary the reluctance of the magnetic path between the legs of the C-shaped timing generator 51. Since the C-shaped timing generator 51 is stationary, the position of the annular ring 36 over the two ferrite legs oscillates radially during each revolution of the spin axis 12. For each revolution of the spin axis 12, the radial oscillation of the annular ring 36 causes it to be sequentially positioned over the inner leg only, over both legs, over the outer leg only, and over both legs again. Thus during each revolution of the spin axis 12, alternate minimum reluctance and maximum reluctance paths are twice formed between the two legs of the C-shaped timing generator 51. Since the reluctance of the magnetic path varies through two maximums and two minimums each revolution, an A.C. electromotive force is generated in winding 51' having a frequency twice that of the frequency of revolution of the spin axis 12. This A.C. electromotive force can thus be used to provide a timing signal of fequency 2N. By circumferentially varying the position of the timing generator 51 around the spin axis 12, the two maximumm amplitude points (or minimum amplitude points) of the timing signal can be made to occur when the torsion bars 28 are parallel to one of the case-referenced orthogonal axes. If such coincidence does not occur, the sensing signal will be resolved into components along orthogonal axes rotated a determinable angle from the case-referenced axes. These two sets of axes can be brought into coincidence, however, by shifting the phase of the timing signal.

The timing signal from the timing generator 51 is fed into a standard phase shifter 54 which provides two timing signals, one shifted in phase from the other by 90°. In an alternative embodiment, a second timing generator may be employed displaced 45° circumferentially from timing generator 51 to provide the second timing signal shifted in phase by 90°. Similarly, a second sensor arrangement may be employed displaced 45° circumferentially from sensor arrangement 40 to provide a second sensing signal shifted in phase by 90°, both sensing signals being coupled to the single timing signal from timing generator 51. The timing signals are coupled along with the sensing signal from the sensor arrangement 40 to demodulator 50 which provides two signals indicative of the components of the angular displacement of the spin axis 12 along the X and the Y coordinates of the case-referenced axes. Since demodulator 50 receives two timing signals and provides two output signals, demodulator 50 may consist of two separate demodulators or a single composite demodulator with two input and output channels.

The vibra-rotor gyroscope illustrated in FIGURE 1 is shown firmly attached to a reference platform 56. As is illustrated in more detail later in this application, this reference platform may be, for example, either a rotational mount, the earth itself, a vehicle, or a four-axis gimbaled platform. In addition, provision has been made to control the interior temperature of the vibra-rotor gyroscope. A thermocouple 58 is shown inserted through the outer casing 10 to measure the interior temperature. A voltage indicative of the temperature therein is coupled to a temperature sensing mechanism 60 via lead 59 which in turn controls temperature regulating apparatus (not shown).

Since the validity of the equation describing the angular excursion $\theta$ of the inertial ring 26 is predicated upon the time of application of a particular spin axis displacement rate $\phi$ being very much less than the time constant of the system, it is desirable that torquing forces be applied to the vibra-rotor gyroscope to null such vibratory motion. In an inertial guidance system, the vibratory motion is usually nulled by rotating the platform upon which the vibra-rotor gyroscope is mounted (and hence applying a torquing force to displace the spin axis). In many other instances, however, it is desirable to be able to null the vibratory motion of the inertial ring 26 without displacing the spin axis. This occurs, for example, when the vibra-rotor gyroscope is fixedly mounted in an aircraft or on the earth and the vibratory motion induced by the aircraft motion or the earth rate must be nulled in order to use the sensing signal generated thereby for reference purposes. On the other hand, it is desirable to be able to directly induce vibratory motion of the inertial ring 26 to correct for positional or guidance errors and use the sensing signal generated thereby to effect mechanical torquing of the spin axis (to null the induced vibratory motion).

In the present invention, the vibratory motion of the inertial ring 26 is nulled (or induced) by applying torquing forces directly to the inertial ring 26 and the iron ring 32 of the vibra-rotor gyroscope. Two torquer arrangements 62 and 64 are mounted to the outer case 10 of the vibra-rotor gyroscope by supporting arrangements 66 and 68 to define the X and Y axes of the case-referenced coordinate system. The torquer arrangements 62 and 64 are composed of E-shaped ferrite pieces and have D.C. generators 70 and 72, respectively, connected to the central legs of the E-shaped configurations. An X command console 74 receives X-component signals from the demodulator 50 and from input 75 and provides torquing signals in response thereto to the outer legs of the torquer arrangement 62. Similarly, a Y command console 76 receives Y-component signals from the demodulator 50 and from input 77 and provides torquing signals in response thereto to the outer legs of the torquer arrangement 64. Depending upon the polarity of the torquing signals applied by the X command console 74 (or the Y command console 76), the magnetic field between the middle leg and one of the two legs of the E-shaped torquer arrangement 62 (or 64) is increased, while the magnetic field between the middle leg and the other leg is decreased. Thus the selective application of torquing signals by the consoles 74 and 76 to the torquer arrangements 62 and 64 generate magnetic torquing fields which can oppose, reinforce, or induce vibratory motion of the inertial ring 26 in the same manner as if an angular displacement were applied to the spin axis 12.

It should be noted that since the inertial ring 26 is rotating at its vibrational frequency, each torquer arrangement views the same vibratory motion each half-cycle of rotation. As such, the polarity of the magnetic torquing fields does not have to change each half-cycle as in the aforementioned application. In addition, as mentioned previously, a torque resolver is no longer necessary as the X-component and Y-component torquing signals are directly applied along their respective case-referenced axes. The omission of the torque resolver greatly simplifies the construction and enhances the accuracy of the vibra-rotor glyroscope (as does the omission of the rotating housing and the rotary transformers in the improved sensor arrangement).

Although the torquer and sensor arrangements and the timing generator have been shown as having particular structures, many other configurations could be devised or adapted (depending on the circumstances) which would function equivalently. In particular circumstances, weight and power requirements may make it advisable to permanently magnetize the central legs of the torquer arrangements. Under other circumstances, it may be desirable to vary the number and positions of the sensor and torquer arrangements; however, the specific torquer arrangement shown is particularly advantageous since it serves to define an orthogonal set of reference axes which function as a reference frame in many positional and guidance systems.

In FIGURE 3, a system using the case-referenced vibra-rotor gyroscope in a torque-to-balance loop is illustrated. The vibra-rotor gyroscope 101 (shown in a simplified plan view) is mounted on a rotational mount 100. The timing signal is fed into a phase shifter 102 which produces two signals, one shifted in phase from the other by 90°. These timing signals are then coupled to a demodulator 104 along with the sensing signal from the vibra-rotor gyroscope 101 (which sensing signal has previously been amplified by amplifier 106). The two demodulated sensing signals, representing the orthogonal components along the case-referenced axes of an angular displacement of the spin axis or an imbalance, are then recorded by X recorder 108 and Y recorder 110. Since in a torque-to-balance configuration the vibra-rotor gyroscope 101 is operating in an earth-referenced coordinate system, a large output signal is induced by the earth rate (approximately 10° per hour). In order to study the effects of any imbalances, this signal must be suppressed as any errors in balance produce signals generally several magnitudes smaller. Provisions are thus shown to introduce signals from generators 112 and 114 into mixers 116 and 118 to suppress the average D.C. component induced by the earth rate and seen by the recorders 108 and 110. Thus, the recorders 110 and 108 only record small error and imbalance signals which can subsequently be analyzed. It is apparent that such generators 112 and 114 can be used to introduce any type of signal desired. If the mixers 116 and 118 are placed, as shown, after the demodulator 104, they may comprise standard resistor networks or summing amplifier; if before, each may comprise a pair of transformers or a single transformer and a phase-shifting network.

The X-component and Y-component signals are coupled by voltage to current converters 120 and 122 (which minimize the dependence of the torquing rate on impedance changes of the torquer arrangements in the vibra-rotor gyroscope 101) to the X and Y case-referenced torquer arrangements in the vibra-rotor gyroscope 101 where they null the vibrations of the inertial ring of the vibra-rotor gyrscope 101. Since, as has been explained previously, the X and Y torquer arrangements are case-referenced, no further resolution of the X and Y torquing signals is necessary. Thus, the errors necessarily attendant on the use of an X-Y resolver (and those due to a rotating sensing transformer) are automatically eliminated by the use of the case-referenced vibra-rotor gyroscope. Only those errors inherent in the performance of the vibra-rotor gyroscope itself are detected and recorded for analysis. It should be noted that mixer 116 and converter 120 and mixer 118 and converter 122 illustrate specific embodiments of the generic X and Y command consoles 74 and 76, respectively, in FIGURE 1, with generators 112 and 114 being coupled to inputs 75 and 77.

In FIGURE 4, the use of a case-referenced vibra-rotor gyroscope as a gyro-compass is illustrated. The particular system shown utilizes the vibra-rotor gyroscope to provide the direction of true north and the west-to-east rotational rate of the earth at the point to which it is affixed. The vibra-rotor gyroscope 201 is adjustably mounted on a platform 200 so that its spin axis can be aligned with the local vertical. The timing signal from the vibra-rotor gyroscope 201 is fed into a phase shifter 202 which generates two timing signals, 90° out of phase with one another. The two timing signals are then fed into a demodulator 204 along with the sensing signal from the sensor arrangement of the vibra-rotor gyroscope 201 (which sensing signal has been previously amplified by amplifier 206). Since the angular displacement inducing the sensing signal is caused by the earth's rotational rate from west to east, the two sensing signals generated by the demodulator 204 represent the orthogonal components in the case-referenced coordinate system of the angular rate around the North-coordinate of the North-East earth-referenced coordinate system.

The angle between the orthogonal axes of the case-referenced coordinate system and the North-East axes of the earth-referenced coordinate system, commonly referred to as the azimuth angle, is determined by coupling the two sensing signals through a standard modulator 208 into the two legs of a resolver 210. The resolver 210 generally comprises a set of orthogonal input coils and a set of orthogonal output coils which can be rotated relative to the input set by hand or by an automatic rotating mechanism 212 such as a servo system. As is commonly known, such a resolver 210 provides a transformation of signals from one coordinate system into another coordinate system rotated from the first by a predesignated angle. Since in the North-East earth-referenced coordinate system the signal representative of the earth rate is a maximum along the North-South axis and a minimum along the East-West axis, the sensing signals coupled to the legs of the resolver 210 will produce a maximum output, the earth rate, on one of the output legs of the resolver 210 and a null on the other output leg of the resolver 210 when the resolver 210 is rotated through the proper azimuth angle. As the position of the orthogonal axes of the case-referenced coordinate system is precisely known, the determined azimuth angle then yields the direction of true north.

As illustrated in FIGURE 4, one of the output legs of the resolver 210 leads into a demodulator 214 and then to a null meter 216. Since there can be two null positions in a 360° rotation, i.e., north and south, the other leg of the resolver 210 is coupled to a demodulator and integrating amplifier 218 and then to a GO-NO-GO indicator 220, the display of which depends on the comparative phase of the corresponding input signal to, and output signal of, the resolver 210. The demodulator portion of the demodulator and integrating amplifier 218 may comprise, for example, a collector-grounded transistor whose base is coupled (via lead 209) to one of the modulated input signals to the resolver 210. This input signal grounds the corresponding output signal of the resolver 210, coupled to the emitter of the transistor (via lead 211), every alternate half-cycle. This mode of operation permits a sequence of positive pulses or negative pulses to enter the integrating amplifier portion which then provides an operating signal for the GO-NO-GO indicator 220 whose display depends upon the polarity (i.e. the comparative phase, as stated above) of the output signal from the integrating amplifier. The vibra-rotor gyroscope 201 is also constantly being torqued to null by X torquing signals and Y torquing signals coupled directly back to the individual case-referenced X and Y torquer arrangements by the respective outputs of the demodulator 204.

In FIGURE 5, two vibra-rotor gyroscopes 301 and 301' are shown (in simplified plan views) along with block diagrammatic circuitry for aircraft guidance. The vibra-rotor gyroscopes 301 and 301' are strapped down to the aircraft, designated by reference numeral 300, in such a manner that the case-referenced orthogonal axes of the vibra-rotor gyroscope 301 define the X and Z axes of the aircraft coordinate system and the case-referenced orthogonal axes of the vibrator-rotor gyroscope 301' define the X and Y axes of the aircraft coordinate system. In such an arrangement, the inertial ring of the vibra-rotor gyroscope 301 lies in the X-Z plane of the aircraft coordinate system, the inertial ring of the vibra-rotor gyroscope 301' lies in the X-Y plane of the aircraft coordinate system, and the spin axes of the vibra-rotor gyroscopes 301 and 301' are orthogonal. The Z axis of the aircraft coordinate system is generally referred to as the azimuth axis, and the X and Y axes are generally referred to as the pitch and roll axes.

When command signals are received by the control and computer console 310 to actuate the attitude controls of the aircraft 300, the motions executed by the aircraft 300 can be described as rotations about the azimuth axis, the pitch axis, and the roll axis. These motions cause angular displacements of the spin axes of the vibra-rotor gyroscopes 301 and 301' and thus cause sensing signals to be generated by the sensor arrangements thereof (because of the induced vibratory motion of the inertial rings). The sensing signals are amplified by amplifiers 306 and 307 and coupled to demodulators 304 and 305 along with the two sets of 90° phase-shifted timing signals generated by phase shifters 302 and 303. The demodulators 304 and 305 generate output signals representative of the aircraft's motion around the X, Y and Z axes of the aircraft coordinate system. Since the signal representative of the X-component is produced by both of the vibra-rotor gyroscopes 301 and 301', the X-component signal is shown coupled directly back to the individual X torquer arrangement of the vibra-rotor gyroscope 301 in order to cage the vibra-rotor gyroscope 301 in its X rotation to the aircraft 300. In this manner, the X rotation of the aircraft 300 is sensed entirely by the vibra-rotor gyroscope 301'. Alternatively, means might be provided for averaging the two X-component signals produced by the vibra-rotor gyroscopes 301 and 301' to furnish an output signal dependent on both vibra-rotor gyroscope X-component output signals. The X, Y and Z component signals are both coupled back to the individual X, Y and Z torquer arrangements to torque the inertial rings of the vibra-rotor gyroscopes 301 and 301' to a null position and fed into the control and computer console 310. The control and computer console 310 compares the actual rotation of the aircraft 300 with the rotation that the aircraft 300 was commanded to perform; if any variance is found, the control and computer console 310 sends out additional signals to the aircraft attitude controls. In this manner, the vibra-rotor gyroscopes 301 and 301' operate to insure that the aircraft is following received or programmed instructions. In the above-described system, the vibra-rotor gyroscopes act independently of the accelerometers which give acceleration or velocity information to the control and computer console 310. These accelerometers may operate either in the aircraft coordinate system or in an inertial coordinate system (mounted on a gimbaled platform) depending upon the desired complexity of the control and computer console 310.

FIGURE 6 illustrates a stabilized platform generally designated 410. The platform 410 includes a stabilized element 411 on which are mounted attitude-determining vibra-rotor gyroscopes (not shown, but directly mounted to the interior of enclosing boxes 412 and 413, respectively, which are affixed to stabilized element 411) with spin axes orthogonal to each other. The vibra-rotor gyroscopes are aligned to define a set of 3-dimensional case-referenced coordinate axes so that the stabilized element 411 is maintained at a fixed attitude or orientation in space. In other words, the vibra-rotor gyroscopes supply an inertial reference to which the stabilized element 411 is slaved. By means of sensor arrangements intercoupling the vibra-rotor gyroscopes and the stabilized element 411, any rotational displacements of the stabilized element 411 about the selected case-referenced coordinate axes are immediately detected; and the stabilized element 411 is rotated with respect to a reference frame 414 in a manner to eliminate the displacements. Thus, the stabilized element 411 is continually fixed in inertial space (or in any desired case-referenced coordinate system by means of torqunig) so that it maintains a fixed attitude defined by the vibra-rotor gyroscopes. In operation, the reference frame 414 is ordinarily fixedly mounted in a vehicle, the stabilized element 411 then being utilized as an attitude reference from which the instantaneous attitude of the vehicle can be determined. Moreover, since the accelerations of the vehicle are, in the average system, continuously integrated to determine the velocity or position of the vehicle, the necessary accelerometers 430, 431, and 432 are shown mounted on the stabilized element 411 to detect accelerations along the known coordinate axes defined by the vibra-rotor gyroscopes and maintained by the stabilized element 411.

In order that the stabilized element 411 may be rotated with respect to the reference frame 414, the stabilized element 411 is mounted in a four-axis gimbal suspension system which comprises an outer gimbal 416, an intermediate gimbal 417, and an inner gimbal 418. The stabilized element 411 is continuously maintained at the fixed attitude defined by the vibra-rotor gyroscopes through coordinated rotations of the gimbals 416, 417, and 418 about the outer roll, pitch, and inner roll axes, respectively, and by the rotation of the stabilized element 411 (the so-called "azimuth gimbal") about the azimuth axis. As indicated in FIGURE 6, azimuth rotator 435 (which may be a conventional servo-motor or other actuator), inner roll rotator 437, pitch rotator 440, and outer roll rotator 442 are mounted to the gimbal system to rotate the gimbals 416, 417, and 418. Upon appropriate electrical energization of any of the rotators 435, 437, 440, and 442, rotation about the corresponding platform axis will be effected.

The above-described mechanism also includes equipment for electrically detecting and indicating rotations of the gimbals and of the stabilized element 411 relative to each other. For example, azimuth rotatio is picked off by an azimuth coarse synchro 445 and an azimuth fine synchro 446. An inner roll synchro 449 indicates the rotation of the gimbal 418 about the inner roll axis, a pitch synchro 450 indicates the rotation of the intermediate gimbal 417 about the pitch axis, and an outer roll synchro 451 indicates the rotation of the outer gimbal 416 about the outer roll axis. A more complete description of a four-axis platform is contained in U.S. Patent 2,949,785, issued Aug. 23, 1960, to Singleton and Erdley.

Further understanding of the manner in which the platform system of this invention operates may be gained by reference to FIGURE 7 which shows an inertial navigation platform system in accordance with the present invention. In the format of FIGURE 7 both the electronic and mechanical connection couplings are illustrated where pertinent to the description of the operation of the system. The system includes a stable element 500 upon which are mounted first and second vibra-rotor gyroscopes 501 and 502 which determined the attitude of the X-Z and X-Y axes of the stable element 500, respectively. Also mounted upon the stable element 500 are three accelerometers 504, 505, and 506. Each of the accelerometers measures acceleration in a particular direction with respect to an initial attitude of the stable element 500 and provides an output representative of the particular acceleration. The output signals generated by the accelerometers 504, 505, and 506 are transferred via a number of conductors (illustrated by paths 508, 509, and 510) to a control and display consol 503, such as a computer, capable of the calculations necessary for determining the distance traveled and other factors relative to the vehicle upon which the accelerometers are placed.

Each of the vibra-rotor gyroscopes 501 and 502 has a sensor arrangement (such as that described with respect to FIGURE 1) for deriving information regarding the vibration motion of its inertial ring. The sensor arrangements generate signals which are transferred via conductors 511 and 512 to a pair of conventional A.C. amplifiers 514 and 515. After amplification, the sensing signals are transferred to a plurality of demodulators where components indicative of the magnitude of the angular displacements about particular coordinate axes are generated. The timing signals from the vibra-rotor gyroscopes 501 and 502 are transferred via conductors 507 and 513 to phase-shifters 518 and 519, each of which generates a pair of timing signals differing 90° in phase from one another.

Since the X-component of the sensing signal generated by the vibra-rotor gyroscope 501 is redundant to that generated by the vibra-rotor gyroscope 502, the former is derived by demodulator 517 and fed back directly to the X torquer arrangement to cage the vibra-rotor gyroscope 501 in its X rotation to the stable element 500. In this manner, the stable element 500 is controlled in X rotation entirely by the vibra-rotor gyroscope 502. Since the vibra-rotor gyroscope 501 and 502 define the attitude of the stable element 500, the X-component signal may be fed back to the vibra-rotor gyroscope 501 without any phase-shift to gang it to the stable element 500. The signal from the amplifier 514 is also transferred to demodulator and azimuth servo-amplifier 525 which derives the component of azimuth information, that is the Z-component, and transfers that information to operate an azimuth rotator 435. At least one of the case-referenced axes of the vibra-rotor gyroscopes 501 and 502 is generally aligned with the azimuth of the platform so that the phase-shifted timing signals generated by the phase-shifter 518 do not have to receive any additional phase shift.

On the other hand, the X and Y coordinates of the gimbals are aligned with the vehicle and vary therewith while the X and Y coordinates of the stable element 500 remain fixed in inertial space (or fixed with respect to the local vertical and North-South, East-West lines). Thus, the X-component and Y-component signals derived with reference to the stable element coordinates system must be phase-shifted by the azimuth angle before application to the gimbal system. To accomplish this, the two, phase-shifted timing signals of the phase shifter 519 are directed to a resolver 521 (of the type described in relation to FIGURE 4) which has a pair of primary windings arranged in quadrature and a pair of rotating secondary windings also arranged in quadrature, the position of the secondary windings being mechanically controlled by the azimuth gimbal of the stable element 500.

The phase-shifted timing signals generated by the resolver 521 are directed to a demodulator and pitch servo amplifier 523 and to a demodulator and inner-roll servo amplifier 524. The demodulator-servo amplifiers 523 and 524 function to provide output signals for controlling the rotators 440 and 437 associated with the pitch and inner roll gimbals, respectively. Finally, a signal is provided by an inner roll synchro 522 which indicates the position of the inner roll gimbal. This signal is transferred to an outer roll servo amplifier 526 to provide a signal for operating the outer roll rotator 442 to drive it to the appropriate position so that gimbal lock-up will not occur. The method of accomplishing the feedback between inner and outer roll gimbals is well illustrated in the above-cited Erdley and Singleton patent.

Also included and mechanically connected (as demonstrated by the dotted lines) to the outer roll gimbal, the pitch gimbal, and the azimuth gimbal, respectively, are synchros 530, 531, and 532 which generate output signals representative of the platform roll, pitch, and true heading in a manner well known in the art. These signals are transferred directly to the associated control and display console 503 where they are utilized to indicate present position and directional heading.

The original position of the stable element 500 and any changes in position required due to operation in the local vertical mode are controlled by signals transferred from the console 503 directly to the individual X, Y, and Z torquer arrangements of vibra-rotor gyroscopes 501 and 502 via conductors 537, 538, and 539. Since all of the torquer arrangements are case-referenced, a torque resolver is not necessary for each of the vibra-rotor gyroscopes 501 and 502, as previously described.

It should be noted that a temperature sensing device 542 may be arranged on the stable element 500 to transfer signals to a temperature control device 543. The device 543 may be conventional in form and operate an element 544 to maintain the temperature of the element 500 substantially constant and eliminate the need for precisely matching temperature coefficients of expansion within the vibra-rotor gyroscopes 501 and 502. Some form of shock ("irrotational") mount may also be associated with the platform system shown in FIGURE 6 to damp external vibrations at the natural frequency of the rotor and harmonics thereof. These mounts are well known, fit between the platform and the vehicle, and mechanically damp any vibrations which might interfere with operation of the system.

Having thus described the invention, it is obvious that numerous modifications and departures may be made by those skilled in the art; thus, the invention is to be construed as limited only by the spirit and scope of the appended claims.

What is claimed is:

1. An improved inertial instrument comprising: a frame; an inertial element rotatable with respect to said frame about a first axis, said inertial element being capable of vibratory motion about a second axis angularly disposed with respect to said first axis; means for rotating said inertial element about said first axis at a preselected frequency of rotation; sensor means stationary with respect to said frame and responsive to vibratory motion of said rotating inertial element for generating sensing signals representative of said vibratory motion; and torquer means stationary with respect to said frame for defining a set of reference axes fixed relative to said frame and for applying individual torquing forces directly to said rotating inertial element about said reference axes.

2. The improved inertial instrument of claim 1 which further includes means for enclosing said inertial element in a controlled atmosphere.

3. The improved inertial instrument of claim 2 wherein said controlled atmosphere is substantially a vacuum and said sensor means and said torquer means are mounted on said means for enclosing said inertial element.

4. An improved inertial system comprising: a frame; an inertial element rotatable with respect to said frame about a first axis, said inertial element being capable of vibratory motion about a second axis substantially orthogonal to said first axis; means for rotating said inertial element about said first axis at a preselected frequency of rotation; sensor means stationary with respect to said frame and responsive to vibratory motion of said rotating inertial element for generating sensing signals representative of said vibratory motion; torquer means stationary with respect to said frame for applying torquing forces directly to said rotating inertial element; and means coupled to said sensor means and responsive to said sensing signals for deriving attitude information signals therefrom including means for generating timing signals having a frequency substantially equal to the sum of said preselected frequency and the frequency of vibration of said inertial element.

5. The improved inertial system of claim 4 wherein said means coupled to said sensor means further includes means for receiving said sensing signals and said timing signals and for deriving said attitude information signals therefrom.

6. An improved inertial instrument comprising: a frame, a member positioned therein and rotatable relative to said frame about a first axis fixed in said frame, an inertial element constrained to rotate with said member and capable of vibratory motion about a second axis fixed in said member and substantially orthogonal to said first axis, sensor means positioned stationary relative to said frame and responsive to the vibratory motion of said rotating inertial element for generating sensing signals representative of said vibratory motion, stationary torquer means responsive to the application of direct current electrical signals for applying torquing forces directly to said rotating inertial element, and means for applying electrical torquing signals to said stationary torquer means.

7. An improved inertial system comprising: a frame; an inertial ring rotatable with respect thereto; motor means mounted to said frame including a rotatable motor casing for rotating said inertial ring at a preselected frequency about a first axis, said inertial ring being torsionally coupled to said motor casing and capable of vibratory motion about a second axis substantially orthogonal to said first axis; stationary sensor means responsive to the vibratory motion of said rotating inertial ring for generating sensing signals representative of said vibratory motion; and stationary torquer means for applying torquing forces to said rotating inertial ring.

8. The improved inertial system of claim 7 further comprising means for generating timing signals having a frequency substantially twice said preselected frequency and means for accepting said sensing signals and said timing signals and for deriving attitude information signals therefrom.

9. An improved inertial system comprising: a casing; a member rotatable relative to said casing about a first axis at a preselected frequency; an inertial ring torsionally mounted coaxial with said member and constrained to rotate therewith, said inertial ring being enclosed by said casing and having a resonant frequency of vibration about a second axis substantially orthogonal to said first axis, said resonant frequency being substantially equal to said preselected frequency; sensor means mounted on said casing and responsive to the vibratory motion of said inertial ring for generating sensing signals representative of said vibratory motion, said sensing signals having a frequency substantially twice said preselected frequency; torquer means, including torquer arrangements mounted on said casing for defining a fixed set of orthogonal reference axes, for applying individual torquing forces about said reference axis to said rotating inertial element; timing means mounted on said casing for generating timing signals having a frequency substantially equal to the frequency of said sensing signals; and means for receiving said timing signals and said sensing signals for deriving attitude information signals therefrom.

10. An improved inertial system comprising: an inertial element; means for rotating said inertial element at a preselected frequency about a first axis, said inertial element being capable of vibratory motion about a second axis angularly disposed with respect to said first axis; sensor means responsive to the vibratory motion of said rotating inertial element for generating sensing signals representative of said vibratory motion; means for applying torquing forces in response to said sensing signals directly to said inertial element to continuously substantially null the vibratory motion thereof; and means adapted to receive said sensing signals for deriving attitude information signals therefrom.

11. The improved inertial system of claim 10 wherein said means for applying torquing forces includes stationary torquer arrangements for defining a set of reference axes and for applying individual torquing forces directly to said inertial element about said reference axes to control the vibratory motion thereof.

12. An improved inertial instrument comprising: an inertial element; means for rotating said inertial element about a first axis, said inertial element being capable of vibratory motion about a second axis angularly disposed in respect to said first axis; sensor means responsive to the vibratory motion of said rotating inertial element for generating sensing signals representative of said vibratory motion; torquer means for applying torquing forces directly to said rotating inertial element; timing means for generating timing signals having a frequency substantially equal to the frequency of said sensing signals, said timing means including means for forming a magnetic flux path having a variable reluctance region therein and means adapted to oscillate with respect to said region at a preselected frequency for periodically varying the reluctance thereof; and means for receiving said timing signals and said sensing signals for deriving attitude information signals therefrom.

13. The improved inertial instrument of claim 12 wherein said oscillating means includes an annular ring rotating about a point other than its center of symmetry.

14. The improved inertial instrument of claim 12 wherein said means for applying torquing forces includes means for generating a pair of oppositely directed magnetic fields emanating from substantially the same point in space and field varying means for simultaneously increasing the field strength of one of said oppositely directed magnetic fields and decreasing the field strength of the other of said oppositely directed magnetic fields.

15. The improved inertial system of claim 14 wherein said generating means includes an E-shaped configuration, said oppositely directed magnetic fields existing between the central and outer legs thereof.

16. The improved inertial system of claim 15 wherein said field varying means simultaneously opposes the magnetic field in one of the outer legs of said E-shaped configuration and reinforces the magnetic field in the other of the outer legs of said E-shaped configuration.

17. An improved inertial system comprising: a structural frame; a pair of vibrating rotor gyroscopes fixed thereto, each of said gyroscopes including an inertial element, means for rotating said inertial element at a preselected frequency about a first axis fixed in said structural frame, and sensor means responsive to the vibratory motion of said rotating inertial element and stationary with respect to said structural frame for generating sensing signals representative of said vibratory motion; torquer means, including torquer arrangements associated with each of said gyroscopes and stationary with respect to said frame, for applying torquing forces tending to rotate said inertial element about preselected axes; and means adapted to receive said sensing signals of said gyroscopes for deriving attitude information signals.

18. The improved inertial system of claim 17 wherein said torquer arrangements of said gyroscopes define a set of three-dimensional coordinate axes for determining the attitude of said gyroscopes and apply individual torquing forces directly to said inertial elements about each of the axes of said set of three-dimensional coordinate axes.

19. The improved inertial system of claim 18 wherein said structural frame is rotatable relative to its surroundings and said torquer means further includes apparatus responsive to said derived attitude information signals for rotating said structural frame to change the attitude of said first axes of said gyroscopes.

20. The improved inertial system of claim 18 wherein said torquer arrangements continuously substantially null the vibratory motion of said inertial element in response to said derived attitude information signals.

21. An improved inertial instrument comprising: an inertial element; means for rotating said inertial element about a first axis, said inertial element being capable of vibratory motion about a second axis angularly disposed with respect to said first axis; sensor means responsive to the vibratory motion of said rotating inertial element for generating sensing signals representative of said vibratory motion; and means adapted to receive said sensing signals for applying torquing forces in response thereto directly to said inertial element to continuously substantially null the vibratory motion thereof.

22. An improved inertial instrument comprising: a frame; an inertial element rotatable with respect to said frame about a first axis, said inertial element being capable of vibratory motion about a second axis angularly disposed with respect to said first axis; means for rotating said inertial element about said first axis at a preselected frequency of rotation; sensor means responsive to the vibratory motion of said rotating inertial element for generating sensing signals representative of said vibratory motion; and torquer means stationary with respect to said frame for defining a set of reference axes fixed relative to said frame and for applying individual torquing forces directly to said rotating inertial element about said reference axes.

23. The improved inertial instrument of claim 22 which further comprises means positioned around said first axis for providing timing signals having a preselected amplitude when said second axis is substantially parallel to the planes formed by said first axis and said reference axes, and means for receiving said sensing signals and said timing signals and for deriving attitude information signals therefrom.

24. An improved inertial instrument comprising: a casing; an inertial element positioned therein and rotable with respect to said casing about a first axis positioned in said casing, said inertial element being sensitive to torquing forces, including rotations of said casing, around axes other than said first axis and responsive thereto by means of vibratory motion about a second axis positioned in said inertial element and orthogonal to said first axis; means for rotating said inertial element about said first axis at a preselected frequency of rotation; sensor means stationary with respect to said casing and responsive to vibratory motion of said rotating inertial element for generating sensing signals indicative of the magnitude of said vibratory motion and the frequency of rotation and vibration of said inertial element; and torquer means stationary with respect to said casing for defining a set of reference axes fixed relative to said casing and for applying individual torquing forces directly to said rotating inertial element about said reference axes.

25. An improved inertial instrument comprising: a casing; an inertial element rotatable with respect to said casing about a first axis fixed in said casing, said inertial element having a preselected frequency of vibration and being capable of vibratory motion about a second axis angularly disposed with respect to said first axis; means for rotating said inertial element about said first axis at a preselected frequency of rotation, said frequencies of rotation and vibration being substantially equal; one or more sensor arrangements positioned on said casing in close proximity to said inertial element and responsive to vibratory motion of said inertial element for generating sensing signals indicative of the magnitude of said vibratory motion and having a frequency substantially double said frequency of rotation; one or more timing generators for generating timing signals having a frequency substantially double said frequency of rotation; and means for receiving said timing signals and said sensing signals and for deriving attitude information signals therefrom.

26. The improved inertial instrument of claim 25 wherein said sensor arrangements are positioned 45° apart around said first axis for generating sensing signals shifted in phase from one another by an integral multiple of 90°.

27. The improved inertial instrument of claim 25 wherein said timing generators are positioned 45° apart around said first axis for generating timing signals shifted in phase from one another by an integral multiple of 90°.

28. An improved inertial system comprising: an inertial element; means for rotating said inertial element at a preselected frequency N about a first axis, said inertial element having a preselected frequency of vibration substantially equal to said frequency of rotation N and capable of vibratory motion about a second axis angularly disposed with respect to said first axis; sensor means stationary in contrast to the rotation of said inertial element and responsive to vibrations thereof for generating sensing signals representative of said vibrations and having a frequency of substantially 2N; means for providing timing signals having a frequency of substantially 2N; and means for receiving said sensing signals and timing signals having said frequency of substantially 2N and for providing direct current electrical attitude information signals therefrom.

29. The improved inertial system of claim 28 further comprising phase shifting means adapted to receive said timing signals having said frequency of substantially 2N for providing a pair of said timing signals having said frequency of substantially 2N phase-shifted 90° from each other.

30. The improved inertial system of claim 28 further comprising filtering means adapted to pass only signals having said frequency of substantially 2N.

31. An improved inertial instrument comprising: a casing, as inertial element rotatable with respect to said casing about a first axis fixed in said casing, said inertial element having a preselected frequency of vibration and being capable of vibratory motion about a second axis angularly disposed with respect to said first axis; means torsionally coupled to said inertial element for rotating said inertial element about said first axis at a preselected frequency of rotation, said frequencies of rotation and vibration being substantially equal; one or more sensor arrangements positioned on said casing in close proximity to said inertial element and responsive to vibratory motion of said inertial element for generating sensing signals indicative of the magnitude of said vibratory motion and having a frequency substantially double said frequency of rotation; and one or more timing generators for generating timing signals having a frequency substantially double said frequency of rotation.

32. The instrument of claim 31 further comprising means for receiving said timing signals and said sensing signals and for deriving attitude information signals therefrom.

33. An improved inertial instrument comprising: an inertial element; means for rotating said inertial element at a preselected frequency N about a first axis, said inertial element being torsionally coupled to said means and capable of vibrating at a frequency substantially equal to said frequency of rotation N about a second axis angularly disposed with respect to said first axis; sensor means stationary in contrast to the rotation of said inertial element and responsive to vibrations thereof for generating sensing signals representative of said vibrations and having a frequency of substantially 2N; and means for providing timing signals having a frequency of substantially 2N.

34. The instrument of claim 33 further comprising means for receiving said sensing signals and said timing signals having said frequency of substantially 2N and for providing direct current electrical attitude information signals therefrom.

References Cited by the Examiner
UNITED STATES PATENTS

| | | | |
|---|---|---|---|
| 2,991,659 | 7/1961 | Bowden | 74—5.6 |
| 2,995,938 | 8/1961 | Brodersen et al | 74—5 X |
| 3,204,467 | 9/1965 | Fischel | 74—5.37 |

FRED C. MATTERN, Jr., *Primary Examiner.*

BROUGHTON G. DURHAM, *Examiner.*

J. PUFFER, T. W. SHEAR, *Assistant Examiners.*